(12) United States Patent
Yan et al.

(10) Patent No.: US 10,670,294 B2
(45) Date of Patent: Jun. 2, 2020

(54) IN-ROOM AIR CONDITIONER ADJUSTMENT METHOD, APPARATUS, AND CONTROLLER

(71) Applicant: Huawei Technologies Co., Ltd., Shenzhen (CN)

(72) Inventors: Xudong Yan, Shenzhen (CN); Linfu Chen, Shenzhen (CN); Zizhao Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 15/965,244

(22) Filed: Apr. 27, 2018

(65) Prior Publication Data

US 2018/0245814 A1 Aug. 30, 2018

Related U.S. Application Data

(63) Continuation of application No. PCT/CN2016/102036, filed on Oct. 13, 2016.

(30) Foreign Application Priority Data

Oct. 28, 2015 (CN) .......................... 2015 1 0715867

(51) Int. Cl.
*F24F 11/63* (2018.01)
*F24F 11/77* (2018.01)
(Continued)

(52) U.S. Cl.
CPC .............. *F24F 11/63* (2018.01); *F24F 11/00* (2013.01); *F24F 11/50* (2018.01); *F24F 11/77* (2018.01);
(Continued)

(58) Field of Classification Search
CPC .. F24F 11/63; F24F 11/50; F24F 11/77; F24F 11/00; F24F 2110/10; F24F 2110/40; G05B 19/042; G05B 2219/2614
See application file for complete search history.

(56) References Cited

U.S. PATENT DOCUMENTS

2006/0091229 A1 5/2006 Bash et al.
2007/0017667 A1 1/2007 Weng
(Continued)

FOREIGN PATENT DOCUMENTS

CA 2791973 A1 4/2013
CN 101012954 A 8/2007
(Continued)

*Primary Examiner* — Thomas C Lee
*Assistant Examiner* — Charles Cai
(74) *Attorney, Agent, or Firm* — Leydig, Voit & Mayer, Ltd.

(57) ABSTRACT

An in-room air conditioner adjustment method is provided and includes: obtaining a return air temperature detected by a temperature sensor corresponding to each air conditioner; adjusting, according to a difference between the obtained return air temperature and a temperature threshold, a fan rotational speed of each air conditioner until it is determined that an absolute value of the difference between the obtained return air temperature detected by the temperature sensor and the temperature threshold is less than a first specified value; determining that the absolute value of the difference between the return air temperature detected by the temperature sensor; and when an absolute value of a difference between fan rotational speeds of any two adjacent air conditioners is greater than a second specified value, adjusting a fan rotational speed of an air conditioner whose fan rotational speed is lower in the two adjacent air conditioners.

9 Claims, 10 Drawing Sheets

(51) Int. Cl.
  *G05B 19/042* (2006.01)
  *F24F 110/40* (2018.01)
  *F24F 110/10* (2018.01)
  *F24F 11/00* (2018.01)
  *F24F 11/50* (2018.01)

(52) U.S. Cl.
  CPC ........ *G05B 19/042* (2013.01); *F24F 2110/10* (2018.01); *F24F 2110/40* (2018.01); *G05B 2219/2614* (2013.01)

(56) References Cited

U.S. PATENT DOCUMENTS

| | | | | |
|---|---|---|---|---|
| 2007/0253831 | A1* | 11/2007 | Lee | F24F 3/161 417/5 |
| 2012/0016526 | A1* | 1/2012 | Burton | G05D 23/1931 700/278 |
| 2013/0045114 | A1* | 2/2013 | Chang | F04D 25/166 417/45 |
| 2016/0193438 | A1* | 7/2016 | White | A61M 16/0051 128/203.12 |
| 2016/0266560 | A1* | 9/2016 | Chou | G05B 19/042 |

FOREIGN PATENT DOCUMENTS

| | | |
|---|---|---|
| CN | 101440988 A | 5/2009 |
| CN | 102878644 A | 1/2013 |
| CN | 103776129 A | 5/2014 |
| CN | 104101055 A | 10/2014 |
| CN | 104571187 A | 4/2015 |
| CN | 104596055 A | 5/2015 |
| CN | 104729018 A | 6/2015 |
| CN | 104949294 A | 9/2015 |
| CN | 105241021 A | 1/2016 |
| EP | 1632737 B1 | 12/2010 |
| EP | 2813776 A1 | 12/2014 |
| WO | 9746834 A1 | 12/1997 |

* cited by examiner

IN-ROOM AIR CONDITIONER ADJUSTMENT METHOD, APPARATUS, AND CONTROLLER

CROSS-REFERENCE TO RELATED APPLICATIONS

This application is a continuation of International Application No. PCT/CN2016/102036, filed on Oct. 13, 2016, which claims priority to Chinese Patent Application No. 201510715867.X, filed on Oct. 28, 2015. The disclosures of the aforementioned applications are hereby incorporated by reference in their entireties.

TECHNICAL FIELD

Embodiments of the present invention relate to the field of electrical control technologies, and in particular, to an in-room air conditioner adjustment method, apparatus, and controller.

BACKGROUND

With development of new technologies such as cloud computing, a heat density of an information technology (IT) device becomes larger, and a higher requirement is imposed on a cooling capacity of an air conditioner in an equipment room. However, generally, an IT device is not always operating at full load. If a cooling device still operates at high load when the IT device operates at low load, a waste of energy is inevitable. To improve energy efficiency, an effective measure must be taken, to adjust an operating status of the air conditioner in the equipment room according to a load state of the IT device to implement on-demand cooling, that is, to ensure that a cooling capacity requirement of the IT device is met, ensure stable operating of the IT device, and avoid wasting a cooling capacity and consuming extra energy.

In the conventional art, a temperature sensor configured to detect a return air temperature is installed on a return air vent side of an air conditioner, and the temperature sensor is connected to a controller that controls a fan of the air conditioner.

The controller obtains a return air temperature according to the temperature sensor, and adjusts a rotational speed of a corresponding fan of the air conditioner according to a difference between the return air temperature and a specified value. If the return air temperature is greater than the specified value, the rotational speed of the fan is increased, an air volume is increased, and a cooling capacity is increased. If the return air temperature is less than the specified value, the rotational speed of the fan is reduced, an air volume is reduced, and a cooling capacity is reduced.

However, in an equipment room, an in-room air conditioner is used for cooling. If different IT cabinets have different device load, a temperature difference easily exists in the equipment room. Consequently, return air temperatures detected by temperature sensors are different, further causing different fan rotational speeds of air conditioners and different air pressures. A plenum is disposed on a supply air vent side of the air conditioner. Therefore, air blown by a fan with a high air pressure flows to an area with a low air pressure. As a result, an insufficient air volume is caused in an area under the charge of the fan, load cannot be met, and a hot spot is generated.

SUMMARY

Embodiments of the present invention provide an in-room air conditioner adjustment method, apparatus, and controller, so as to reduce a possibility of generating a hot spot.

According to a first aspect, an embodiment of the present invention provides an in-room air conditioner adjustment apparatus, including:

multiple temperature sensors, where the multiple temperature sensors are separately disposed on return air vent sides of air conditioners included in a room in which the apparatus is located, and are configured to detect a return air temperature on a return air vent side of each air conditioner; and a controller, separately connected to the multiple temperature sensors, and configured to: obtain a return air temperature detected by each temperature sensor and adjust, according to a difference between the obtained return air temperature and a temperature threshold, a fan rotational speed of an air conditioner detected by each temperature sensor until it is determined that an absolute value of the difference between the return air temperature detected by each temperature sensor and the temperature threshold is less than a first specified value; and when the absolute value of the difference between the return air temperature detected by each temperature sensor and the temperature threshold is less than the first specified value, if it is determined that an absolute value of a difference between fan rotational speeds of any two adjacent air conditioners is greater than a second specified value, adjust a fan rotational speed of an air conditioner whose fan rotational speed is lower in the two adjacent air conditioners.

With reference to the first aspect, in a first possible implementation of the first aspect, the apparatus further includes:

multiple pressure sensors, where the multiple pressure sensors are separately disposed at air vent ends of the air conditioners, and are configured to detect an air pressure value at an air vent end of each air conditioner, where the controller is further separately connected to at least one pressure sensor, and the controller is further configured to: obtain an air pressure value detected by each pressure sensor; and after it is determined that the absolute value of the difference between the return air temperature detected by each temperature sensor and the temperature threshold is less than the first specified value, adjust, according to a difference between the obtained air pressure value detected by each pressure sensor and an air pressure threshold, a fan rotational speed of an air conditioner detected by each pressure sensor until it is determined that an absolute value of the difference between the air pressure value detected by each pressure sensor and the air pressure threshold is less than a third specified value; and before the adjusting a fan rotational speed of an air conditioner whose fan rotational speed is lower in the two adjacent air conditioners, the controller is further configured to:

determine, by the controller, that the absolute value of the difference between the air pressure value detected by each pressure sensor and the air pressure threshold is less than the third specified value.

With reference to the first possible implementation of the first aspect, in a second possible implementation of the first aspect, each pressure sensor is a wireless pressure sensor.

With reference to the second possible implementation of the first aspect, in a third possible implementation of the first aspect, each wireless pressure sensor is connected to the controller in a Wireless Fidelity (WiFi) manner, a Bluetooth manner, or an infrared manner.

With reference to the second possible implementation of the first aspect, in a fourth possible implementation of the first aspect, the apparatus further includes:

a receiver, connected to each wireless pressure sensor in a wireless manner and connected to the controller by using a control cable, where the receiver is configured to: receive, in a wireless manner, the air pressure value detected by each wireless pressure sensor; and output the received air pressure value to the controller by using the control cable.

According to a second aspect, an embodiment of the present invention provides an in-room air conditioner adjustment method, including:

obtaining a return air temperature detected by a temperature sensor disposed on a return air vent side of each air conditioner, and adjusting, according to a difference between the obtained return air temperature and a temperature threshold, a fan rotational speed of an air conditioner detected by each temperature sensor until it is determined that an absolute value of the difference between the return air temperature detected by each temperature sensor and the temperature threshold is less than a first specified value; and when the absolute value of the difference between the return air temperature detected by each temperature sensor and the temperature threshold is less than the first specified value, if it is determined that an absolute value of a difference between fan rotational speeds of any two adjacent air conditioners is greater than a second specified value, adjusting a fan rotational speed of an air conditioner whose fan rotational speed is lower in the two adjacent air conditioners.

With reference to the second aspect, in a first possible implementation of the second aspect, the method further includes:

obtaining an air pressure value detected by each wireless pressure sensor; and after it is determined that the absolute value of the difference between the return air temperature detected by each temperature sensor and the temperature threshold is less than the first specified value, adjusting, according to a difference between the obtained air pressure value detected by each wireless pressure sensor and an air pressure threshold, a fan rotational speed of an air conditioner detected by each wireless pressure sensor until it is determined that an absolute value of the difference between the air pressure value detected by each wireless pressure sensor and the air pressure threshold is less than a third specified value; and before the adjusting a fan rotational speed of an air conditioner whose fan rotational speed is lower in the two adjacent air conditioners, the method further includes:

determining that the absolute value of the difference between the air pressure value detected by each wireless pressure sensor and the air pressure threshold is less than the third specified value.

According to a third aspect, an embodiment of the present invention provides an in-room air conditioner adjustment controller, including:

a processing unit and a transceiver unit, where the transceiver unit is configured to obtain a return air temperature detected by a temperature sensor disposed on a return air vent side of each air conditioner; and the processing unit is configured to: adjust, according to a difference between the return air temperature obtained by the transceiver unit and a temperature threshold, a fan rotational speed of each air conditioner until it is determined that an absolute value of the difference between the return air temperature that is detected by the temperature sensor corresponding to each air conditioner and that is obtained by the transceiver unit and the temperature threshold is less than a first specified value; and when it is determined that the absolute value of the difference between the return air temperature detected by each temperature sensor and the temperature threshold is less than the first specified value, if it is determined that an absolute value of a difference between fan rotational speeds of any two adjacent air conditioners is greater than a second specified value, adjust a fan rotational speed of an air conditioner whose fan rotational speed is lower in the two adjacent air conditioners.

With reference to the third aspect, in a first possible implementation of the third aspect, the transceiver unit is further configured to obtain an air pressure value detected by each wireless pressure sensor; and after it is determined that the absolute value of the difference between the return air temperature detected by each temperature sensor and the temperature threshold is less than the first specified value, the processing unit is further configured to:

adjust, according to a difference between the air pressure value that is detected by a wireless pressure sensor disposed at an air vent end of each air conditioner and that is obtained by the transceiver unit and an air pressure threshold, a fan rotational speed of an air conditioner detected by each wireless pressure sensor until it is determined that an absolute value of the difference between the air pressure value that is detected by each wireless pressure sensor and that is obtained by the transceiver unit and the air pressure threshold is less than a third specified value; and before the adjusting a fan rotational speed of an air conditioner whose fan rotational speed is lower in the two adjacent air conditioners, the processing unit is further configured to:

determine that the absolute value of the difference between the air pressure value detected by each wireless pressure sensor and the air pressure threshold is less than the third specified value.

In the embodiments of the present invention, a temperature sensor is disposed for each air conditioner, to detect a temperature on a return air vent side. A controller is separately connected to each temperature sensor and is configured to: obtain a return air temperature detected by each temperature sensor and adjust, according to a difference between the obtained return air temperature and a temperature threshold, a fan rotational speed of each air conditioner until it is determined that an absolute value of the difference between the return air temperature detected by each temperature sensor and the temperature threshold is less than a first specified value; determine that the absolute value of the difference between the return air temperature detected by the temperature sensor corresponding to each air conditioner in a room and the temperature threshold is less than the first specified value; and when an absolute value of a difference between fan rotational speeds of any two adjacent air conditioners is greater than a second specified value, adjust a fan rotational speed of an air conditioner whose fan rotational speed is lower in the two adjacent air conditioners. After it is determined that the absolute value of the difference between the return air temperature detected by the temperature sensor corresponding to each air conditioner in the room and the temperature threshold is less than the first specified value, if the absolute value of the difference between the fan rotational speeds of the any two adjacent air conditioners is greater than the second specified value, the air conditioner whose fan rotational speed is lower in the any two adjacent air conditioners is adjusted, thereby reducing the difference between the rotational speeds of the two adjacent air conditioners, reducing an air pressure difference generated between the two adjacent air conditioners, and reducing a possibility that air blown by a fan with a high air pressure flows to an area with a low air pressure.

DESCRIPTION OF EMBODIMENTS

To make the objectives, technical solutions, and advantages of the present invention clearer, the following further describes the present invention in detail with reference to the accompanying drawings. Apparently, the described embodiments are merely some of rather than all of the embodiments of the present invention. All other embodiments obtained by persons of ordinary skill in the art based on the embodiments of the present invention without creative efforts shall fall within the protection scope of the present invention.

The embodiments of the present invention provide an in-room air conditioner adjustment method, apparatus, and controller, so as to reduce a possibility of generating a hot spot. The method and the apparatus are based on a same invention idea. Because principles of resolving problems according to the method and the apparatus are similar, mutual reference may be made to implementations of the apparatus and the method, and repeated content is not described redundantly.

An embodiment of the present invention provides an in-room air conditioner adjustment apparatus. The apparatus is applied to a room with multiple air conditioners. The apparatus includes multiple temperature sensors and a controller.

Figure 1:
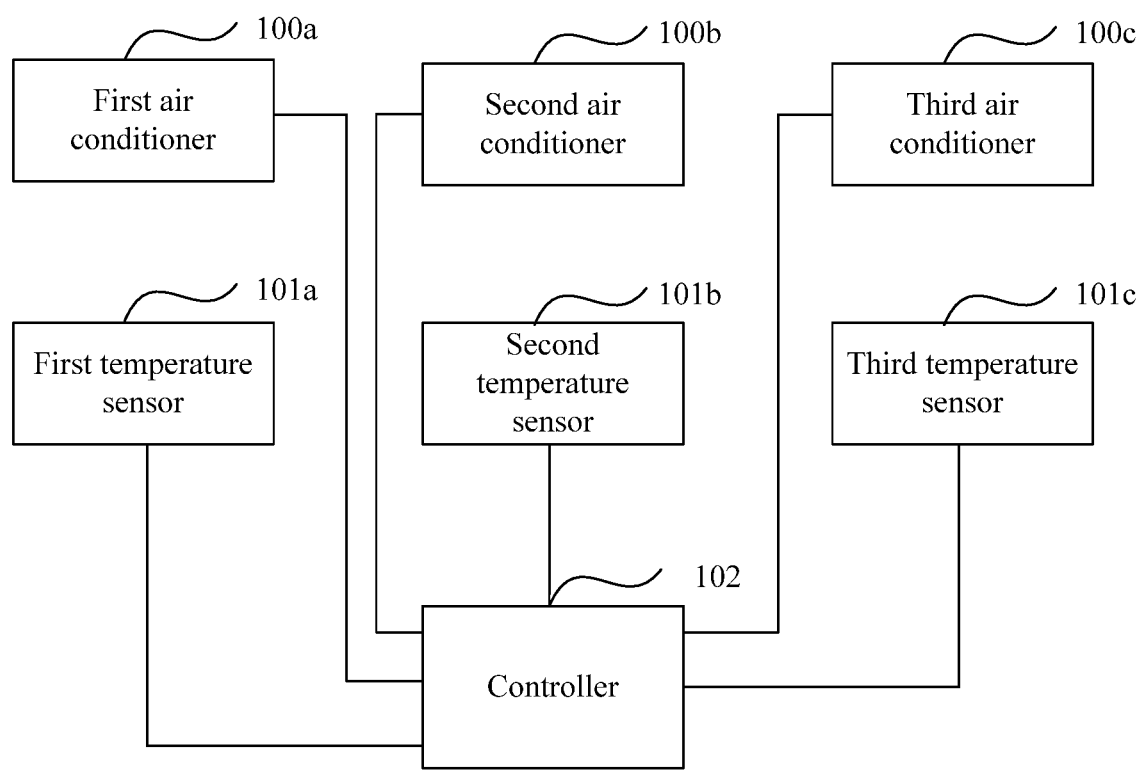
FIG. 1 is a schematic diagram of an in-room air conditioner adjustment apparatus according to an embodiment of the present invention.

In this embodiment of the present invention, three air conditioners, three temperature sensors, and a controller are used as an example for description, for example, as shown in FIG. 1, a first air conditioner 100a, a second air conditioner 100b, and a third air conditioner 100c. The first air conditioner 100a and the third air conditioner 100c are disposed on two sides of the second air conditioner 100b. The three temperature sensors are a first temperature sensor 101a, a second temperature sensor 101b, and a third temperature sensor 101c. The temperature sensors are separately disposed on return air vent sides of the air conditioners included in the room in which the apparatus is located, and are configured to detect a return air temperature on a return air vent side of each air conditioner. The first temperature sensor 101a is disposed on a return air vent side of the first air conditioner 100a, and is configured to detect a return air temperature on the return air vent side of the first air conditioner 100a. The second temperature sensor 101b is disposed on a return air vent side of the second air conditioner 100b, and is configured to detect a return air temperature on the return air vent side of the second air conditioner 100b. The third temperature sensor 101c is disposed on a return air vent side of the third air conditioner 100c, and is configured to detect a return air temperature on the return air vent side of the third air conditioner 100c. The controller 102 is separately connected to the multiple temperature sensors. The first temperature sensor 101a, the second temperature sensor 101b, and the third temperature sensor 101c are separately connected to the controller 102.

The controller 102 obtains a return air temperature detected by each temperature sensor and adjusts, according to a difference between the obtained return air temperature and a temperature threshold, a fan rotational speed of an air conditioner detected by each temperature sensor until it is determined that an absolute value of the difference between the return air temperature detected by each temperature sensor and the temperature threshold is less than a first specified value; and when the absolute value of the difference between the return air temperature detected by each temperature sensor and the temperature threshold is less than the first specified value, if it is determined that an absolute value of a difference between fan rotational speeds of any two adjacent air conditioners is greater than a second specified value, adjusts a fan rotational speed of an air conditioner whose fan rotational speed is lower in the two adjacent air conditioners.

That the controller 102 obtains a return air temperature detected by each temperature sensor may be: when detecting the return air temperature, each temperature sensor transmits the return air temperature to the controller 102. Each temperature sensor may periodically detect a return air temperature and then periodically transmit the return air temperature to the controller 102. The controller 102 may also actively obtain, from each temperature sensor, the return air temperature detected by each temperature sensor.

In this embodiment of the present invention, a temperature sensor is disposed for each air conditioner, to detect a temperature on a return air vent side. A controller is separately connected to a temperature sensor corresponding to each air conditioner and is configured to separately execute the following steps for each air conditioner in a room: obtaining a return air temperature detected by the temperature sensor corresponding to each air conditioner and adjusting, according to a difference between the obtained return air temperature and a temperature threshold, a fan rotational speed of each air conditioner until it is determined that an absolute value of the difference between the obtained return air temperature detected by the temperature sensor corresponding to each air conditioner and the temperature threshold is less than a first specified value; determining that the absolute value of the difference between the return air temperature detected by the temperature sensor corresponding to each air conditioner in the room and the temperature threshold is less than the first specified value; and when an absolute value of a difference between fan rotational speeds of any two adjacent air conditioners is greater than a second specified value, adjusting a fan rotational speed of an air conditioner whose fan rotational speed is lower in the two adjacent air conditioners. After it is determined that the absolute value of the difference between the return air temperature detected by the temperature sensor corresponding to each air conditioner in the room and the temperature threshold is less than the first specified value, if the absolute value of the difference between the fan rotational speeds of the any two adjacent air conditioners is greater than the second specified value, the air conditioner whose fan rotational speed is lower in the any two adjacent air conditioners is adjusted, thereby reducing the difference between the rotational speeds of the two adjacent air conditioners, reducing an air pressure difference generated between the two adjacent air conditioners, and reducing a possibility that air blown by a fan with a high air pressure flows to an area with a low air pressure.

Figure 2A:
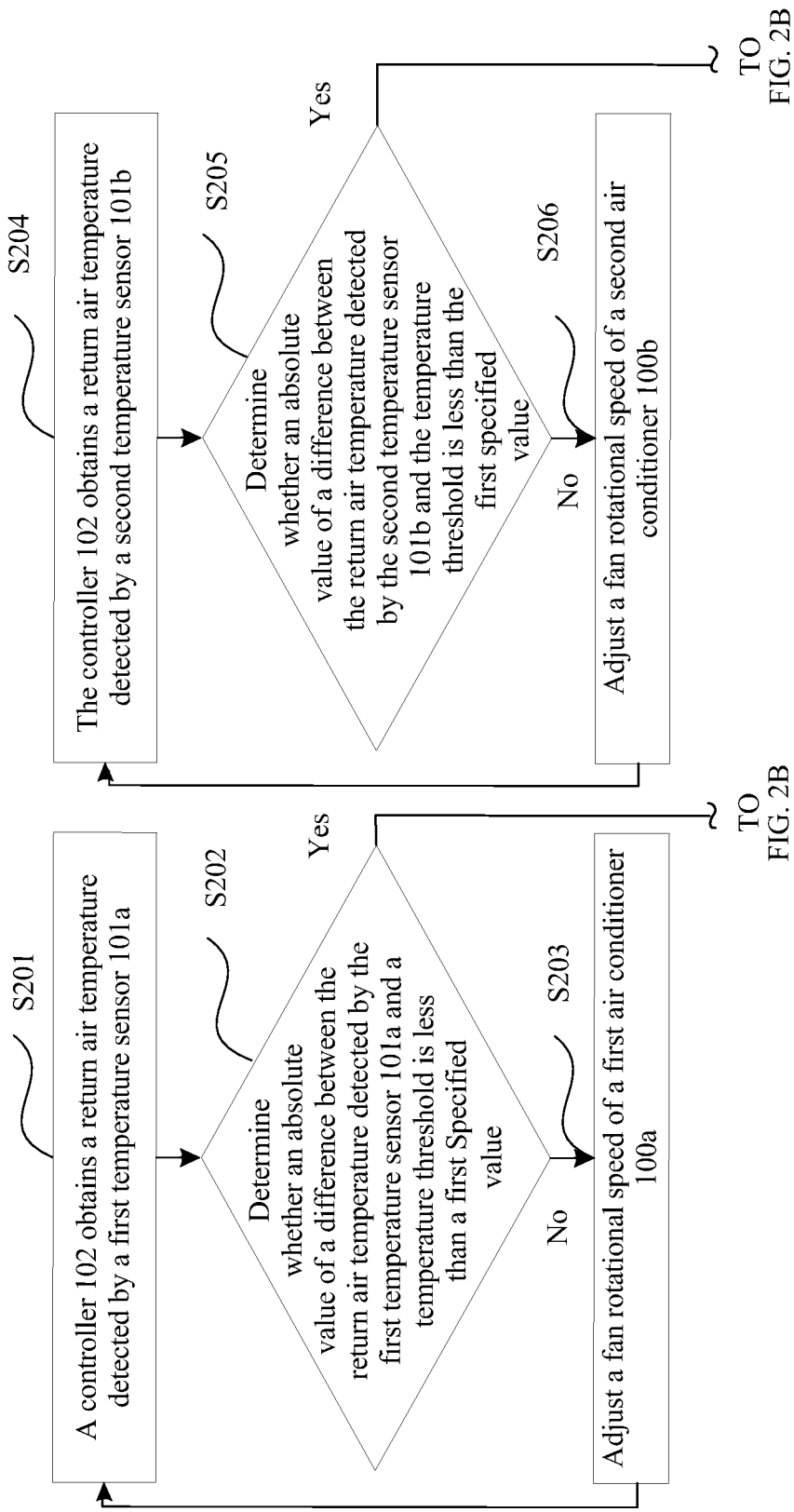
FIG. 2A and FIG. 2B are a flowchart of an in-room air conditioner adjustment method according to an embodiment of the present invention.
Figure 2B:
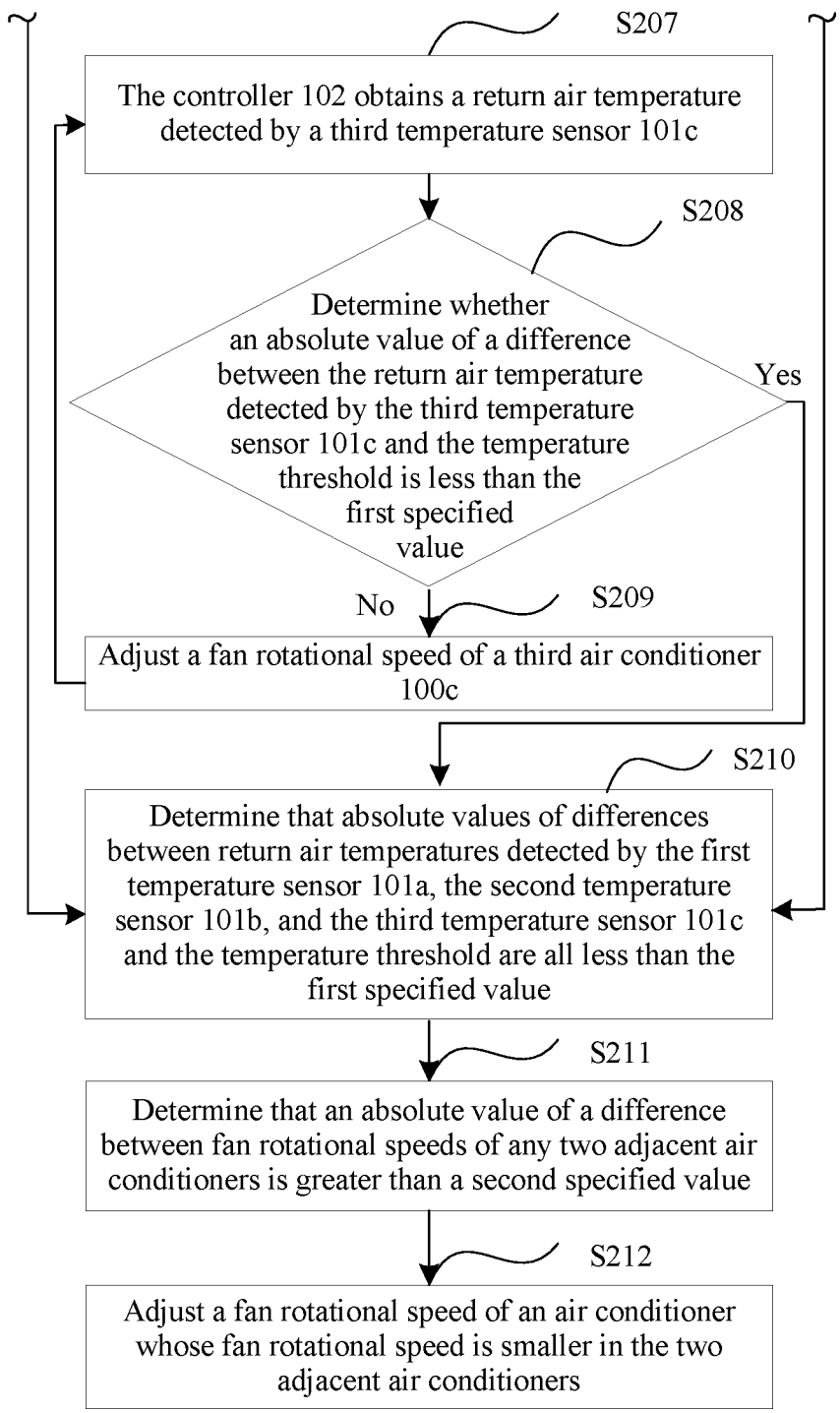

Specifically, the steps are separately executed for each air conditioner, as shown in FIG. 2A and FIG. 2B.

S201. The controller 102 obtains the return air temperature detected by the first temperature sensor 101a, and performs step S202.

S202. Determine whether an absolute value of a difference between the return air temperature detected by the first temperature sensor 101a and the temperature threshold is less than the first specified value; and if the absolute value is less than the first specified value, perform step S210, or if the absolute value is not less than the first specified value, perform step S203.

S203. Adjust a fan rotational speed of the first air conditioner 100a, and perform step S201.

For example, the first specified value is 2 degrees, and the temperature threshold is 45 degrees. If the return air temperature detected by the first temperature sensor 101a is 50 degrees, the fan rotational speed of the first air conditioner 100a is adjusted.

S204. The controller 102 obtains the return air temperature detected by the second temperature sensor 101b, and performs step S205.

S205. Determine whether an absolute value of a difference between the return air temperature detected by the second temperature sensor 101b and the temperature threshold is less than the first specified value; and if the absolute value is less than the first specified value, perform step S210, or if the absolute value is not less than the first specified value, perform step S206.

S206. Adjust a fan rotational speed of the second air conditioner 100b, and perform step S204.

S207. The controller 102 obtains the return air temperature detected by the third temperature sensor 101c, and performs step S208.

S208. Determine whether an absolute value of a difference between the return air temperature detected by the third temperature sensor 101c and the temperature threshold is less than the first specified value; and if the absolute value is less than the first specified value, perform step S210, or if the absolute value is not less than the first specified value, perform step S209.

S209. Adjust a fan rotational speed of the third air conditioner 100c, and perform step S207.

S210. Determine that absolute values of differences between return air temperatures detected by the first temperature sensor 101a, the second temperature sensor 101b, and the third temperature sensor 101c and the temperature threshold are all less than the first specified value, and perform step S211.

Specifically, if it is determined that the absolute values of the differences between the return air temperatures detected by the first temperature sensor 101a, the second temperature sensor 101b, and the third temperature sensor 101c and the temperature threshold are not all less than the first specified value, it is determined that the absolute value of the difference between the return air temperature detected by the first temperature sensor 101a and the temperature threshold is not less than the first specified value, and step S203 is performed. If it is determined that the absolute value of the difference between the return air temperature detected by the second temperature sensor 101b and the temperature threshold is not less than the first specified value, step S206 is performed. If it is determined that the absolute value of the difference between the return air temperature detected by the third temperature sensor 101c and the temperature threshold is not less than the first specified value, step S209 is performed.

S211. Determine that the absolute value of the difference between the fan rotational speeds of the any two adjacent air conditioners is greater than the second specified value, and perform step S212. When it is determined that the absolute value of the difference between the fan rotational speeds of the any two adjacent air conditioners is not greater than the second specified value, a process ends.

S212. Adjust the fan rotational speed of the air conditioner whose fan rotational speed is lower in the two adjacent air conditioners.

It is assumed that the second specified value is 10 r/s. After the adjustment, a rotational speed of the first air conditioner 100a is 100 r/min, a rotational speed of the second air conditioner 100b is 108 r/min, and a rotational speed of the third air conditioner 100c is 95 r/min. It is determined that a difference between rotational speeds of the second air conditioner 100b and the third air conditioner 100c is 13 r/min. The rotational speed of the third air conditioner is adjusted to 98 r/min.

Figure 3:
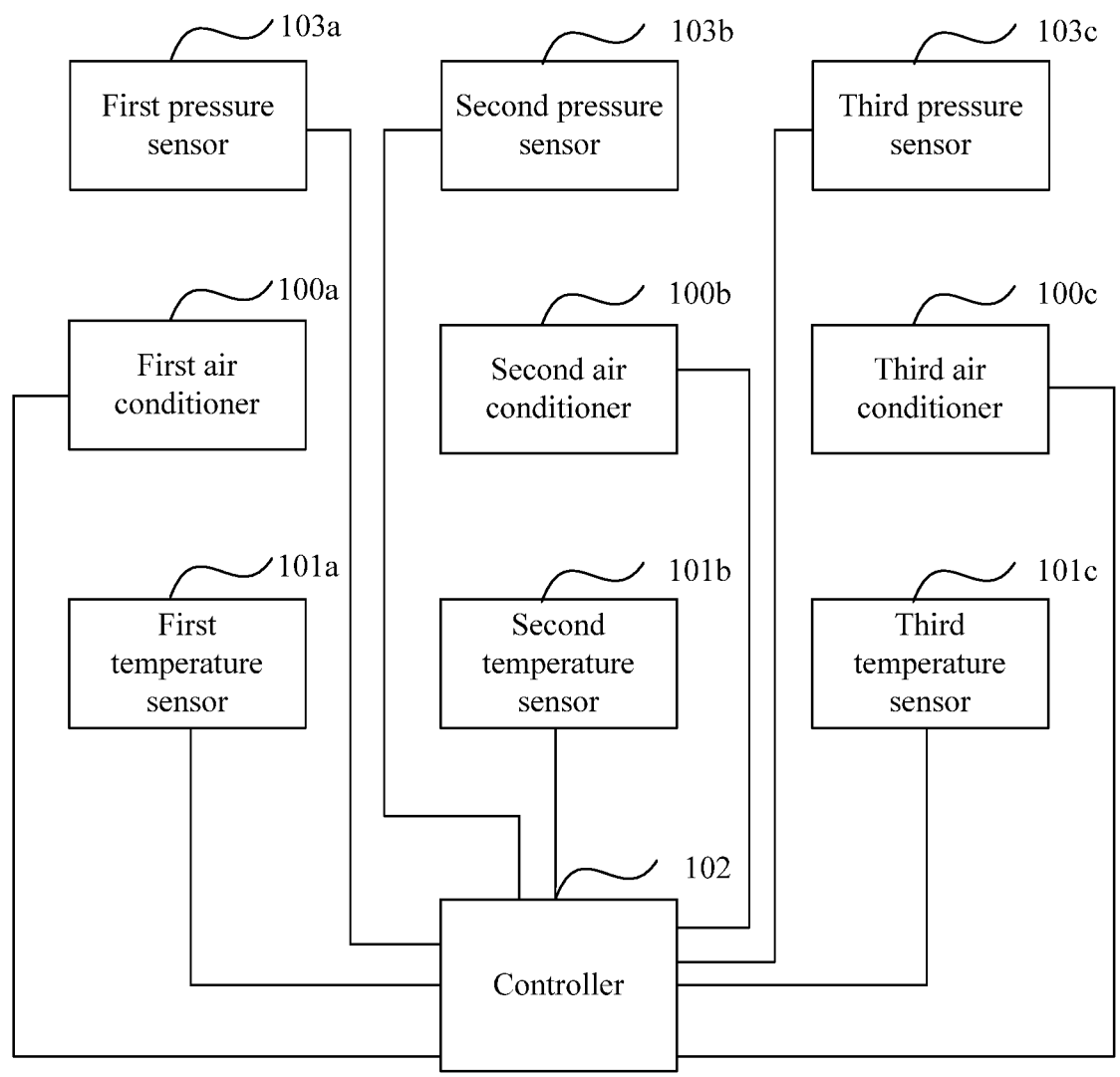
FIG. 3 is a schematic diagram of another in-room air conditioner adjustment apparatus according to an embodiment of the present invention.

Optionally, as shown in FIG. 3, the apparatus may further include multiple pressure sensors, such as a first pressure sensor 103a, a second pressure sensor 103b, and a third pressure sensor 103c.

The multiple pressure sensors are separately disposed at air vent ends of the air conditioners, and are configured to detect an air pressure value at an air vent end of each air conditioner. The controller 102 is further separately connected to the multiple pressure sensors. The first pressure sensor 103a is disposed at an air vent end of the first air conditioner 100a, and is configured to detect an air pressure value at the vent end of the first air conditioner 100a. The second pressure sensor 103b is disposed at an air vent end of the second air conditioner 100b, and is configured to detect an air pressure value at the vent end of the second air conditioner 100b. The third pressure sensor 103c is disposed at an air vent end of the third air conditioner 100c, and is configured to detect an air pressure value at the vent end of the third air conditioner 100c. The first pressure sensor 103a, the second pressure sensor 103b, and the third pressure sensor 103c are separately connected to the controller 102.

The controller 102 obtains a return air temperature detected by each temperature sensor and adjusts, according to a difference between the obtained return air temperature and a temperature threshold, a fan rotational speed of an air conditioner detected by each temperature sensor until it is determined that an absolute value of the difference between the return air temperature detected by each temperature sensor and the temperature threshold is less than a first specified value; and obtains an air pressure value detected by each pressure sensor, and after it is determined that the absolute value of the difference between the return air temperature detected by each temperature sensor and the temperature threshold is less than the first specified value, adjusts, according to a difference between the obtained air pressure value detected by each pressure sensor and an air pressure threshold, a fan rotational speed of an air conditioner detected by each pressure sensor until it is determined that an absolute value of the difference between the air pressure value detected by each pressure sensor and the air pressure threshold is less than a third specified value.

Then, when it is determined that the absolute value of the difference between the return air temperature detected by each temperature sensor and the temperature threshold is less than the first specified value and it is determined that the absolute value of the difference between the air pressure value detected by each pressure sensor and the air pressure threshold is less than the third specified value, if it is determined that an absolute value of a difference between fan rotational speeds of any two adjacent air conditioners is greater than a second specified value, the controller 102 adjusts a fan rotational speed of an air conditioner whose fan rotational speed is lower in the two adjacent air conditioners.

That the controller 102 obtains an air pressure value detected by each pressure sensor may be as follows: when detecting the air pressure value, each pressure sensor transmits the air pressure value to the controller 102, so that the controller obtains the air pressure value. Each pressure sensor may periodically detect an air pressure value and then transmit the air pressure value to the controller 102. The controller 102 may also actively obtain, from each pressure sensor, the return air temperature value detected by each pressure sensor. The controller 102 may also send a detection instruction to each pressure sensor. When receiving the detection instruction, each pressure sensor detects a return air temperature value and then transmits the detected return air temperature value to the controller 102.

In this embodiment of the present invention, a fan rotational speed of a single air conditioner is controlled by using a return air temperature, thereby achieving an objective of cooling according to an actual load status of an IT cabinet and improving energy efficiency. After it is determined that an absolute value of a difference between a return air temperature detected by a temperature sensor corresponding to each air conditioner in a room and a temperature threshold is less than a first specified value, if an absolute value of a difference between fan rotational speeds of any two adjacent air conditioners is greater than a second specified value, an air conditioner whose rotational speed is lower in the any two adjacent air conditioners is adjusted, thereby reducing the difference between the rotational speeds of the two adjacent air conditioners, reducing an air pressure difference generated between the two adjacent air conditioners, and reducing a possibility that air blown by a fan with a high air pressure flows to an area with a low air pressure. Then, a remote pressure of an air vent of a floor is sensed by using a pressure sensor. A fan is adjusted according to a difference between the sensed pressure and a specified value, to ensure an air supply distance and eliminate a hot spot in an equipment room, thereby improving reliability.

Figure 4A:
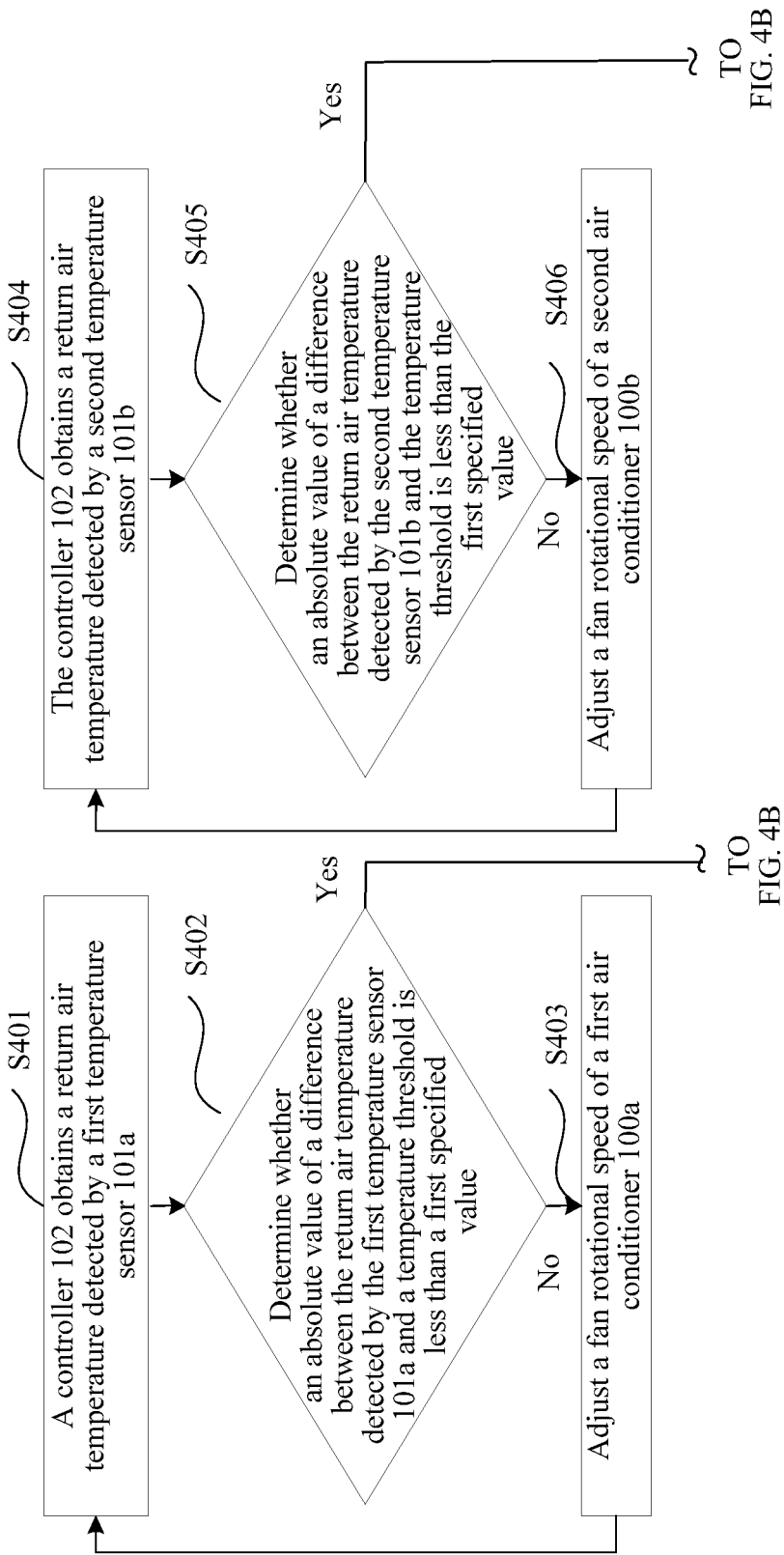
FIG. 4A and FIG. 4B are a flowchart of another in-room air conditioner adjustment method according to an embodiment of the present invention.
Figure 4B:
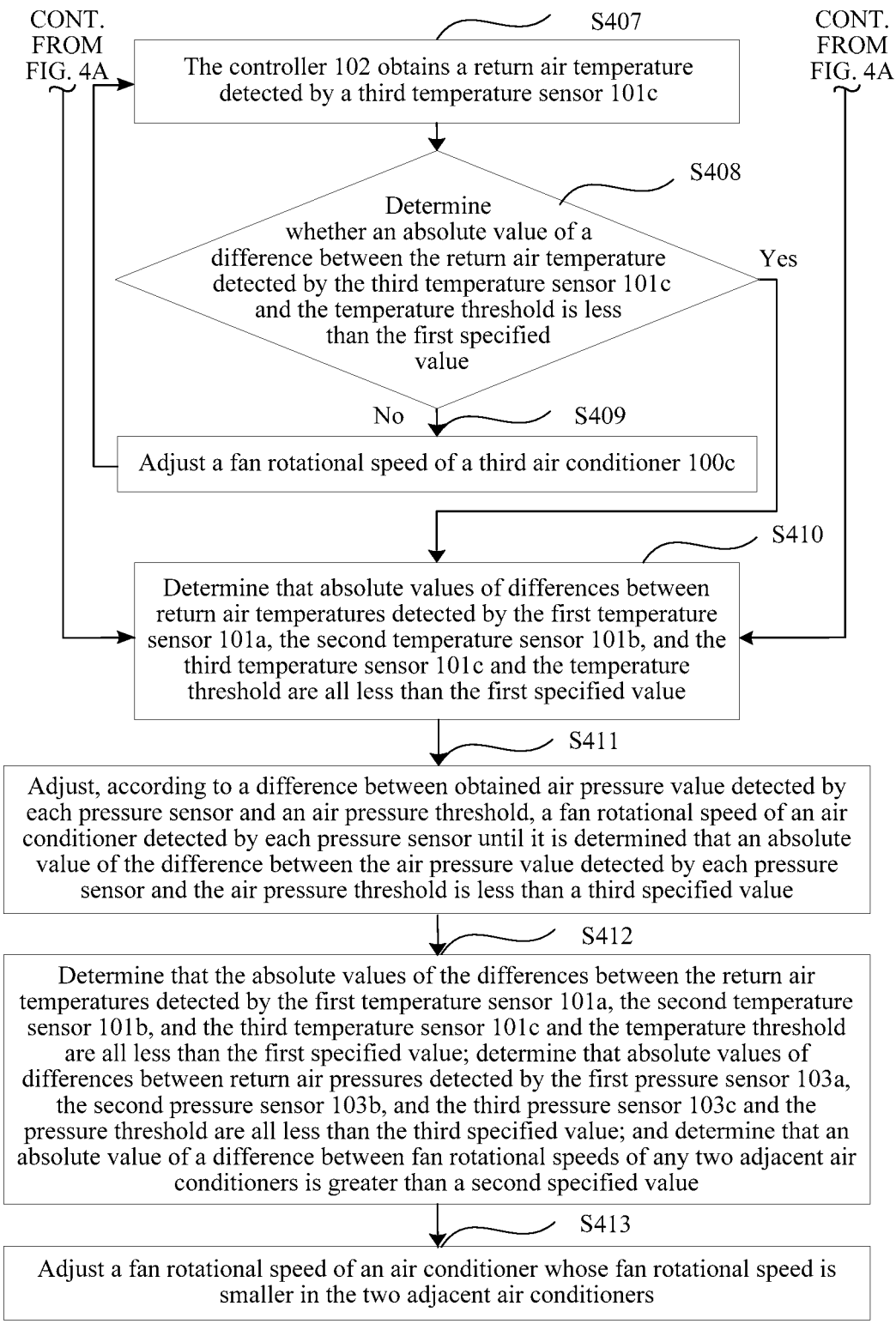

Optionally, the steps are separately executed for each air conditioner, as shown in FIG. 4A and FIG. 4B.

S401. The controller 102 obtains the return air temperature detected by the first temperature sensor 101a, and performs step S402.

S402. Determine whether an absolute value of a difference between the return air temperature detected by the first temperature sensor 101a and the temperature threshold is less than the first specified value; and if the absolute value is less than the first specified value, perform step S410, or if the absolute value is not less than the first specified value, perform step S403.

S403. Adjust a fan rotational speed of the first air conditioner 100a, and perform step S401.

S404. The controller 102 obtains the return air temperature detected by the second temperature sensor 101b, and performs step S405.

S405. Determine whether an absolute value of a difference between the return air temperature detected by the second temperature sensor 101b and the temperature threshold is less than the first specified value; and if the absolute value is less than the first specified value, perform step S410, or if the absolute value is not less than the first specified value, perform step S406.

S406. Adjust a fan rotational speed of the second air conditioner 100b, and perform step S404.

S407. The controller 102 obtains the return air temperature detected by the third temperature sensor 101c, and performs step S408.

S408. Determine whether an absolute value of a difference between the return air temperature detected by the third temperature sensor 101c and the temperature threshold is less than the first specified value; and if the absolute value is less than the first specified value, perform step S410, or if the absolute value is not less than the first specified value, perform step S409.

S409. Adjust a fan rotational speed of the third air conditioner 100c, and perform step S407.

S410. Determine that absolute values of differences between return air temperatures detected by the first temperature sensor 101a, the second temperature sensor 101b, and the third temperature sensor 101c and the temperature threshold are all less than the first specified value, and perform step S411.

Specifically, if it is determined that the absolute values of the differences between the return air temperatures detected by the first temperature sensor 101a, the second temperature sensor 101b, and the third temperature sensor 101c and the temperature threshold are not all less than the first specified value, it is determined that the absolute value of the difference between the return air temperature detected by the first temperature sensor 101a and the temperature threshold is not less than the first specified value, and step S403 is performed. If it is determined that the absolute value of the difference between the return air temperature detected by the second temperature sensor 101b and the temperature threshold is not less than the first specified value, step S406 is performed. If it is determined that the absolute value of the difference between the return air temperature detected by the third temperature sensor 101c and the temperature threshold is not less than the first specified value, step S409 is performed.

S411. Adjust, according to the difference between the obtained air pressure value detected by each pressure sensor and the air pressure threshold, the fan rotational speed of the air conditioner detected by each pressure sensor until it is determined that the absolute value of the difference between the air pressure value detected by each pressure sensor and the air pressure threshold is less than the third specified value, and perform step S412.

Each pressure sensor may periodically detect an air pressure value of each air conditioner and then transmit the air pressure value to the controller 102. Therefore, the controller 102 may periodically obtain the air pressure value.

S412. Determine that the absolute values of the differences between the return air temperatures detected by the first temperature sensor 101a, the second temperature sensor 101b, and the third temperature sensor 101c and the temperature threshold are all less than the first specified value; determine that absolute values of differences between return air pressures values detected by the first pressure sensor 103a, the second pressure sensor 103b, and the third pressure sensor 103c and the pressure threshold are all less than the third specified value; determine that the absolute value of the difference between the fan rotational speeds of the any two adjacent air conditioners is greater than the second specified value; and perform step S413.

When it is determined that the absolute value of the difference between the fan rotational speeds of the any two adjacent air conditioners is not greater than the second specified value, a process ends.

S413. Adjust the fan rotational speed of the air conditioner whose fan rotational speed is lower in the two adjacent air conditioners.

Figure 5A:
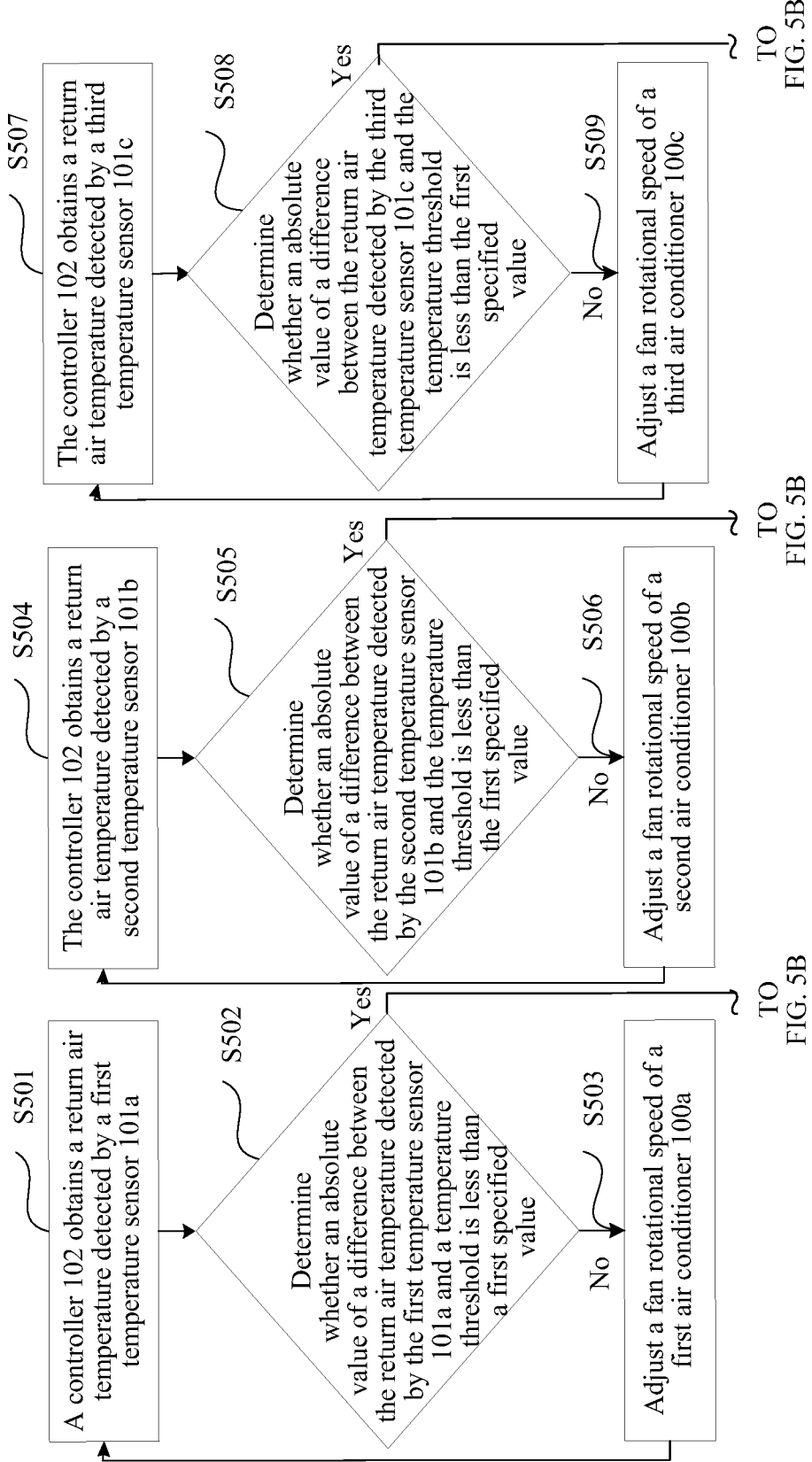
FIG. 5A, FIG. 5B, and FIG. 5C are a flowchart of still another in-room air conditioner adjustment method according to an embodiment of the present invention.
Figure 5B:
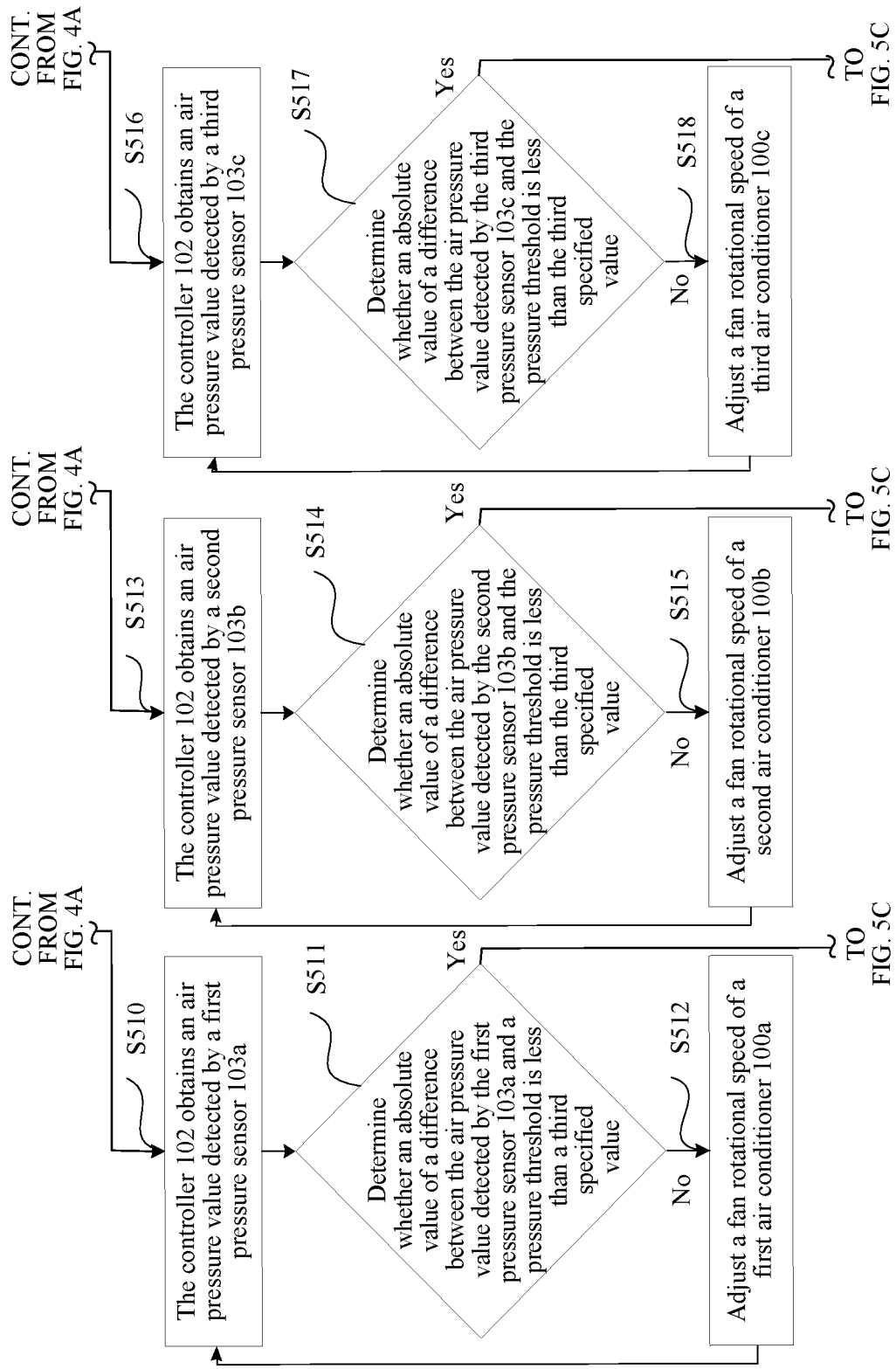
Figure 5C:
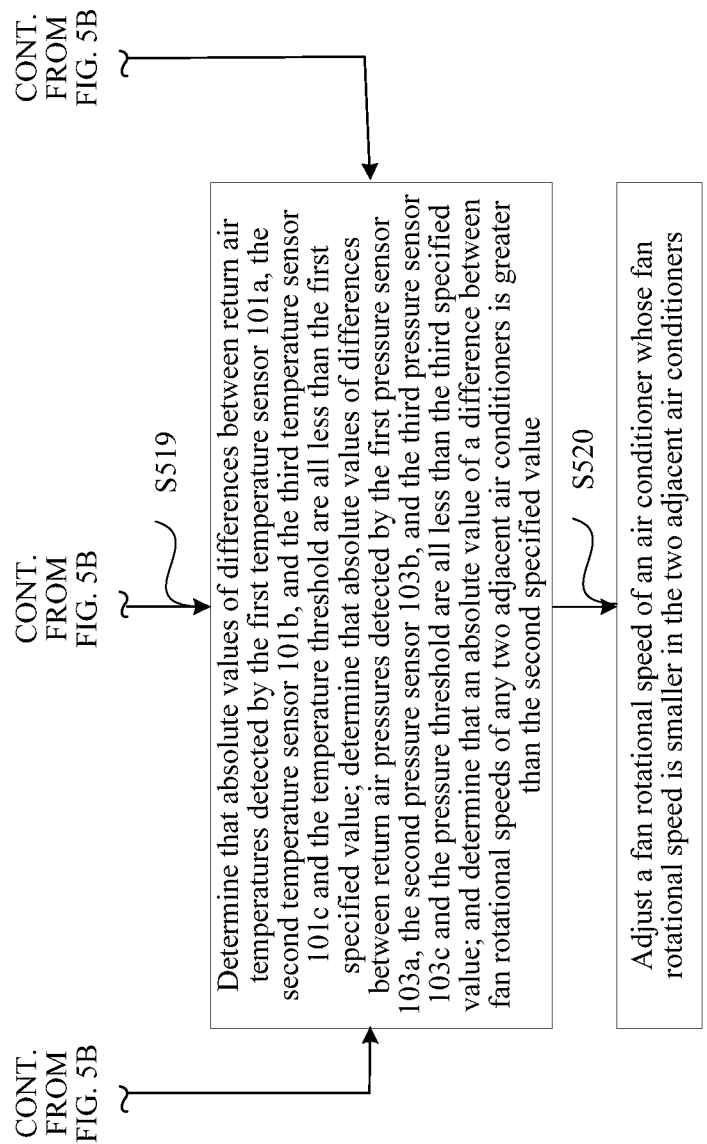

Optionally, the steps may also be separately executed for each air conditioner, as shown in FIG. 5A, FIG. 5B, and FIG. 5C.

S501. The controller 102 obtains the return air temperature detected by the first temperature sensor 101a, and performs step S502.

S502. Determine whether an absolute value of a difference between the return air temperature detected by the first temperature sensor 101a and the temperature threshold is less than the first specified value; and if the absolute value is less than the first specified value, perform step S510, or if the absolute value is not less than the first specified value, perform step S503.

S503. Adjust a fan rotational speed of the first air conditioner 100a, and perform step S501.

S504. The controller 102 obtains the return air temperature detected by the second temperature sensor 101b, and performs step S505.

S505. Determine whether an absolute value of a difference between the return air temperature detected by the second temperature sensor 101b and the temperature threshold is less than the first specified value; and if the absolute value is less than the first specified value, perform step S513, or if the absolute value is not less than the first specified value, perform step S506.

S506. Adjust a fan rotational speed of the second air conditioner 100b, and perform step S504.

S507. The controller 102 obtains the return air temperature detected by the third temperature sensor 101c, and performs step S508.

S508. Determine whether an absolute value of a difference between the return air temperature detected by the third temperature sensor 101c and the temperature threshold is less than the first specified value; and if the absolute value is less than the first specified value, perform step S516, or if the absolute value is not less than the first specified value, perform step S509.

S509. Adjust a fan rotational speed of the third air conditioner 100c, and perform step S507.

S510. The controller 102 obtains the air pressure value detected by the first pressure sensor 103a, and performs step S511.

S511. Determine whether an absolute value of a difference between the air pressure value detected by the first pressure sensor 103a and the pressure threshold is less than the third specified value; and if the absolute value is less than the third specified value, perform step S519, or if the absolute value is not less than the third specified value, perform step S512.

S512. Adjust a fan rotational speed of a first air conditioner 100a, and perform step S510.

The controller may periodically and actively obtain the air pressure value detected by the first pressure sensor 103a. Alternatively, the first pressure sensor 103a may periodically report the air pressure value periodically detected by the first pressure sensor 103a.

S513. The controller 102 obtains the air pressure value detected by the second pressure sensor 103b, and performs step S514.

S514. Determine whether an absolute value of a difference between the air pressure value detected by the second pressure sensor 103b and the pressure threshold is less than the third specified value; and if the absolute value is less than the third specified value, perform step S519, or if the absolute value is not less than the third specified value, perform step S515.

S515. Adjust a fan rotational speed of a second air conditioner 100b, and perform step S513.

S516. The controller 102 obtains the air pressure value detected by the third pressure sensor 103c, and performs step S517.

S517. Determine whether an absolute value of a difference between the air pressure value detected by the third pressure sensor 103c and the pressure threshold is less than the third specified value; and if the absolute value is less than the third specified value, perform step S519, or if the absolute value is not less than the third specified value, perform step S518.

S518. Adjust a fan rotational speed of a third air conditioner 100c, and perform step S516.

S519. Determine that absolute values of differences between return air temperatures detected by the first temperature sensor 101a, the second temperature sensor 101b, and the third temperature sensor 101c and the temperature threshold are all less than the first specified value; determine that absolute values of differences between return air pressures detected by the first pressure sensor 103a, the second pressure sensor 103b, and the third pressure sensor 103c and the pressure threshold are all less than the third specified value; determine that the absolute value of the difference between the fan rotational speeds of the any two adjacent air conditioners is greater than the second specified value; and perform step S520.

When it is determined that the absolute value of the difference between the fan rotational speeds of the any two adjacent air conditioners is not greater than the second specified value, a process ends.

S520. Adjust the fan rotational speed of the air conditioner whose fan rotational speed is lower in the two adjacent air conditioners.

Optionally, each pressure sensor is a wireless pressure sensor.

Specifically, each wireless pressure sensor is connected to the controller 102 in a Wireless Fidelity WiFi manner, a Bluetooth manner, or an infrared manner.

Other than any one of the foregoing three connection manners, each wireless pressure sensor may also be connected to the controller 102 in another wireless manner. Details are not described in this embodiment of the present invention.

Optionally, each pressure sensor is a wireless pressure sensor, and the apparatus may further include:

a receiver, connected to each wireless pressure sensor in a wireless manner and connected to the controller by using a control cable, where the receiver is configured to: receive, in a wireless manner, the air pressure value detected by each wireless pressure sensor; and output the received air pressure value to the controller by using the control cable.

A remote pressure of an air vent of a floor is sensed by using a wireless pressure sensor. A fan rotational speed is adjusted according to a sensed air pressure value, to ensure an air supply distance and eliminate a hot spot generated in an equipment room, thereby improving reliability and reducing cabling workloads.

Figure 6:
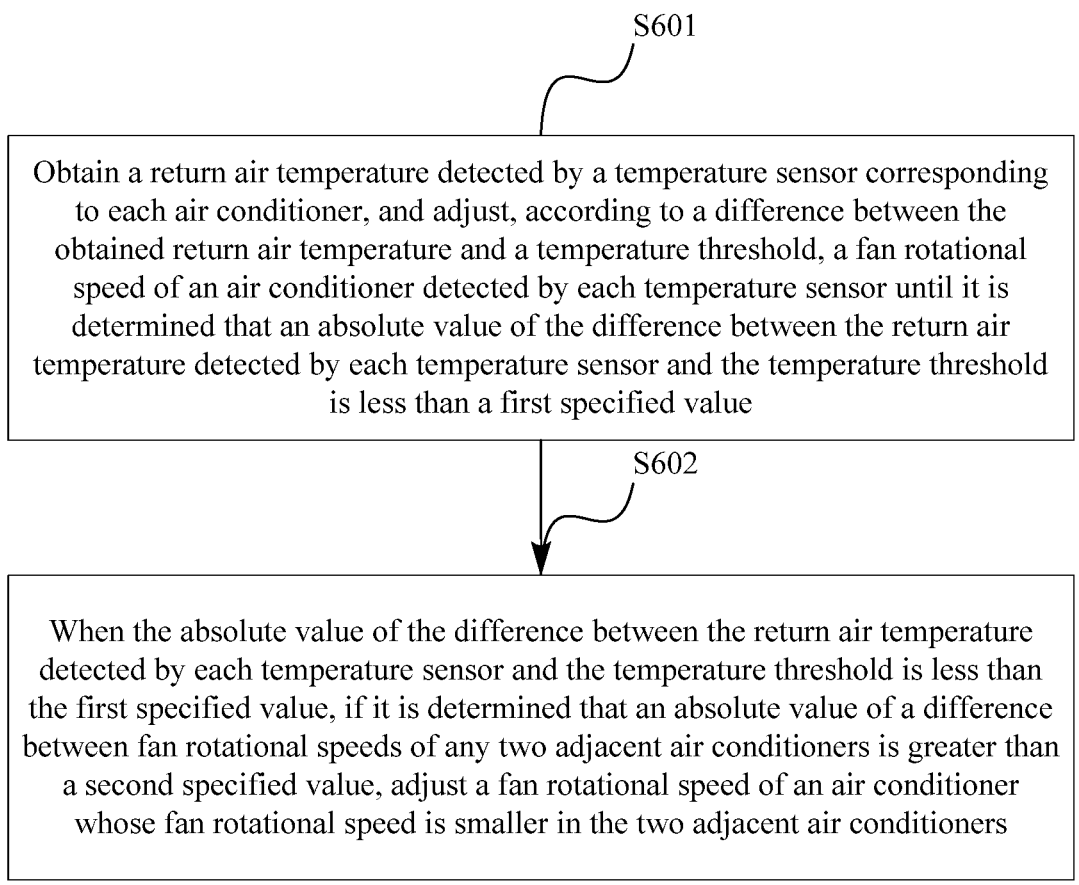
FIG. 6 is a flowchart of yet another in-room air conditioner adjustment method according to an embodiment of the present invention.

Based on an invention idea that is the same as that of the foregoing apparatus embodiment, an embodiment of the present invention further provides an in-room air conditioner adjustment method. The method may be executed by a controller 102. As shown in FIG. 6, the method includes the following steps.

S601. Obtain a return air temperature detected by a temperature sensor corresponding to each air conditioner, and adjust, according to a difference between the obtained return air temperature and a temperature threshold, a fan rotational speed of an air conditioner detected by each temperature sensor until it is determined that an absolute value of the difference between the return air temperature detected by each temperature sensor and the temperature threshold is less than a first specified value.

Each air conditioner is corresponding to a temperature sensor, and the temperature sensor is disposed on a return air vent side of the air conditioner.

S602. When the absolute value of the difference between the return air temperature detected by each temperature sensor and the temperature threshold is less than the first specified value, if it is determined that an absolute value of a difference between fan rotational speeds of any two adjacent air conditioners is greater than a second specified value, adjust a fan rotational speed of an air conditioner whose fan rotational speed is lower in the two adjacent air conditioners.

Optionally, the method further includes:

obtaining an air pressure value detected by a wireless pressure sensor that is disposed at an air vent end of each air conditioner, where a time sequence is not distinguished for obtaining the air pressure value detected by each wireless pressure sensor and obtaining the return air temperature detected by the temperature sensor corresponding to each air conditioner; and, the obtaining the air pressure value detected by each wireless pressure sensor and the obtaining the return air temperature detected by the temperature sensor corresponding to each air conditioner may be performed simultaneously, where a wireless pressure sensor is disposed at an air vent end of an air conditioner;

after it is determined that the absolute value of the difference between the return air temperature detected by each temperature sensor and the temperature threshold is less than the first specified value, adjusting, according to a difference between the obtained air pressure value detected by each wireless pressure sensor and an air pressure threshold, a fan rotational speed of an air conditioner corresponding to each wireless pressure sensor until it is determined that an absolute value of the difference between the air pressure value detected by each wireless pressure sensor and the air pressure threshold is less than a third specified value; and then, when it is determined that the absolute value of the difference between the return air temperature detected by each temperature sensor and the temperature threshold is less than the first specified value and it is determined that the absolute value of the difference between the air pressure value detected by each wireless pressure sensor and the air pressure threshold is less than the third specified value, if it is determined that the absolute value of the difference between the fan rotational speeds of the any two adjacent air conditioners is greater than the second specified value, adjusting the fan rotational speed of the air conditioner whose fan rotational speed is lower in the two adjacent air conditioners.

Figure 7:
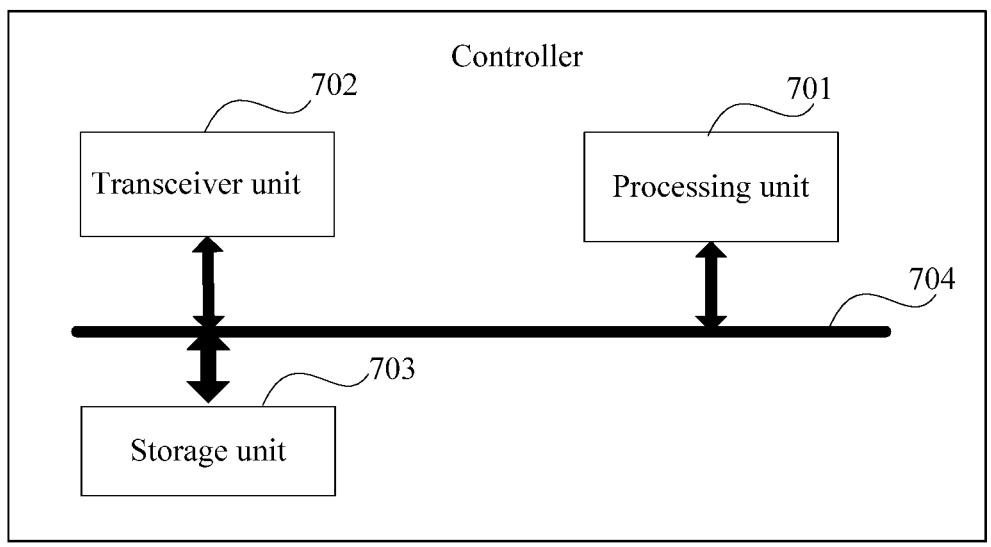
FIG. 7 is a schematic diagram of still another in-room air conditioner adjustment apparatus according to an embodiment of the present invention.

Based on an invention idea that is the same as that of the foregoing method and apparatus embodiments, an embodiment of the present invention further provides an in-room air conditioner adjustment controller. As shown in FIG. 7, the controller includes:

a processing unit 701 and a transceiver unit 702, where the transceiver unit 702 is configured to obtain a return air temperature detected by a temperature sensor disposed on a return air vent side of each air conditioner; and the processing unit 701 is configured to: adjust, according to a difference between the return air temperature obtained by the transceiver unit 702 and a temperature threshold, a fan rotational speed of each air conditioner until it is determined that an absolute value of the difference between the return air temperature that is detected by the temperature sensor corresponding to each air conditioner and that is obtained by the transceiver unit 702 and the temperature threshold is less than a first specified value; and when it is determined that the absolute value of the difference between the return air temperature detected by each temperature sensor and the temperature threshold is less than the first specified value, if it is determined that an absolute value of a difference between fan rotational speeds of any two adjacent air conditioners is greater than a second specified value, adjust a fan rotational speed of an air conditioner whose fan rotational speed is lower in the two adjacent air conditioners.

The processing unit 701 may be a central processing unit (CPU).

This embodiment of the present invention further includes a storage unit 703. The storage unit 703 is configured to store program code executed by the processing unit 701 and may be a volatile memory, such as a random-access memory (RAM). The storage unit 703 may also be a non-volatile memory, such as a read-only memory (ROM), a flash memory, a hard disk drive (HDD), or a solid-state drive (SSD). Alternatively, the storage unit 703 is any other medium that can be configured to carry or store expected program code in a form of an instruction or a data structure and that can be accessed by a computer. However, no limitation is imposed thereon. The storage unit 703 may be a combination of the foregoing memories.

This embodiment of the present invention does not limit a specific connection medium between the foregoing components. In this embodiment of the present invention, in FIG. 7, the storage unit 703, the processing unit 701, and the transceiver unit 702 are connected by using a bus 704. The bus is indicated by a bold line in FIG. 7. A connection manner between other components is described merely as an example and is not limited herein. The bus may be classified into an address bus, a data bus, a control bus, and the like. For ease of representation, the bus is represented by using only one bold line in FIG. 7. However, it does not mean that there is only one bus or one type of buses.

Optionally, the transceiver unit 702 is further configured to obtain an air pressure value detected by each wireless pressure sensor. The transceiver unit 702 may obtain, in a wireless manner, the air pressure value detected by each wireless pressure sensor. The transceiver unit 702 may be implemented by using a WIFI apparatus, an infrared apparatus, a Bluetooth apparatus, or the like.

Optionally, the transceiver unit 702 may further obtain, by using an external receiver of the controller, the air pressure value detected by each wireless pressure sensor.

After it is determined that the absolute value of the difference between the return air temperature detected by each temperature sensor and the temperature threshold is less than the first specified value, the processing unit 701 is further configured to:

adjust, according to a difference between the air pressure value that is detected by each wireless pressure sensor and that is obtained by the transceiver unit 702 and an air pressure threshold, a fan rotational speed of an air conditioner corresponding to each wireless pressure sensor until it is determined that an absolute value of the difference between the air pressure value that is detected by each wireless pressure sensor and that is obtained by the transceiver unit 702 and the air pressure threshold is less than a third specified value.

Before the adjusting a fan rotational speed of an air conditioner whose fan rotational speed is lower in the two adjacent air conditioners, the processing unit 701 is further configured to:

determine that the absolute value of the difference between the air pressure value detected by each wireless pressure sensor and the air pressure threshold is less than the third specified value.

In this embodiment of the present invention, a fan rotational speed of a single air conditioner is controlled by using a return air temperature, thereby achieving an objective of cooling according to an actual load status of an IT cabinet and improving energy efficiency. After it is determined that an absolute value of a difference between a return air temperature detected by a temperature sensor corresponding to each air conditioner in a room and a temperature threshold is less than a first specified value, if an absolute value of a difference between fan rotational speeds of any two adjacent air conditioners is greater than a second specified value, an air conditioner whose rotational speed is lower in the any two adjacent air conditioners is adjusted, thereby reducing the difference between the rotational speeds of the two adjacent air conditioners, reducing an air pressure difference generated between the two adjacent air conditioners, and reducing a possibility that air blown by a fan with a high air pressure flows to an area with a low air pressure. Then, a remote pressure of an air vent of a floor is sensed by using a pressure sensor. A fan is adjusted according to a difference between the sensed pressure and a specified value, to ensure an air supply distance and eliminate a hot spot in an equipment room, thereby improving reliability. A wireless pressure sensor is used, thereby reducing cabling workloads.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An in-room air conditioner adjustment apparatus, comprising:

multiple temperature sensors, wherein the multiple temperature sensors are separately disposed on return air vent sides of air conditioners in a room in which the apparatus is located, and are configured to detect a return air temperature on the return air vent side of each air conditioner; and a controller, separately connected to the multiple temperature sensors, and configured to: obtain the return air temperature detected by each temperature sensor, and adjust, according to a difference between the obtained return air temperature and a temperature threshold, a fan rotational speed of an air conditioner until it is determined that an absolute value of the difference between the return air temperature detected by each temperature sensor and the temperature threshold is less than a first specified value; and when the absolute value of the difference between the return air temperature detected by each temperature sensor and the temperature threshold is less than the first specified value, when it is determined that an absolute value of a difference between fan rotational speeds of any two adjacent air conditioners is greater than a second specified value, adjust a fan rotational speed of an air conditioner whose fan rotational speed is lower in the two adjacent air conditioners.

2. The apparatus according to claim 1, further comprising:
multiple pressure sensors, wherein the multiple pressure sensors are separately disposed at air vent ends of the air conditioners, and are configured to detect an air pressure value at the air vent end of each air conditioner, wherein
the controller is further separately connected to the pressure sensors, and the controller is further configured to: obtain the air pressure value detected by each pressure sensor; and after it is determined that the absolute value of the difference between the return air temperature detected by each temperature sensor and the temperature threshold is less than the first specified value, adjust, according to a difference between the obtained air pressure value detected by each pressure sensor and an air pressure threshold, a fan rotational speed of an air conditioner until it is determined that an absolute value of the difference between the air pressure value detected by each pressure sensor and the air pressure threshold is less than a third specified value; and
before the adjusting the fan rotational speed of the air conditioner whose fan rotational speed is lower in the two adjacent air conditioners, the controller is further configured to:
determine that the absolute value of the difference between the air pressure value detected by each pressure sensor and the air pressure threshold is less than the third specified value.

3. The apparatus according to claim 2, wherein each pressure sensor is a wireless pressure sensor.

4. The apparatus according to claim 3, wherein each wireless pressure sensor is connected to the controller in a Wireless Fidelity (WiFi) manner, a Bluetooth manner, or an infrared manner.

5. The apparatus according to claim 3, further comprising:
a receiver, connected to each wireless pressure sensor in a wireless manner and connected to the controller by using a control cable, wherein
the receiver is configured to: receive, in a wireless manner, the air pressure value detected by each wireless pressure sensor; and output the received air pressure value to the controller by using the control cable.

6. An in-room air conditioner adjustment method, comprising:
obtaining a return air temperature detected by a temperature sensor disposed on a return air vent side of each air conditioner, and adjusting, according to a difference between the obtained return air temperature and a temperature threshold, a fan rotational speed of an air conditioner until it is determined that an absolute value of the difference between the return air temperature detected by each temperature sensor and the temperature threshold is less than a first specified value; and
when the absolute value of the difference between the return air temperature detected by each temperature sensor and the temperature threshold is less than the first specified value, when it is determined that an absolute value of a difference between fan rotational speeds of any two adjacent air conditioners is greater than a second specified value, adjusting a fan rotational speed of an air conditioner whose fan rotational speed is lower in the two adjacent air conditioners.

7. The method according to claim 6, further comprising:
obtaining an air pressure value detected by a wireless pressure sensor that is disposed at an air vent end of each air conditioner; and
after it is determined that the absolute value of the difference between the return air temperature detected by each temperature sensor and the temperature threshold is less than the first specified value, adjusting, according to a difference between the obtained air pressure value detected by each wireless pressure sensor and an air pressure threshold, a fan rotational speed of an air conditioner until it is determined that an absolute value of the difference between the air pressure value detected by each wireless pressure sensor and the air pressure threshold is less than a third specified value; and
before the adjusting a fan rotational speed of an air conditioner whose fan rotational speed is lower in the two adjacent air conditioners, the method further comprises:
determining that the absolute value of the difference between the air pressure value detected by each wireless pressure sensor and the air pressure threshold is less than the third specified value.

8. An in-room air conditioner adjustment controller, comprising a processor and a transceiver, wherein
the transceiver is configured to obtain a return air temperature detected by a temperature sensor disposed on a return air vent side of each air conditioner; and
the processor is configured to: adjust, according to a difference between the return air temperature obtained by the transceiver and a temperature threshold, a fan rotational speed of each air conditioner until it is determined that an absolute value of the difference between the return air temperature that is detected by the temperature sensor corresponding to each air conditioner and that is obtained by the transceiver and the temperature threshold is less than a first specified value; and when it is determined that the absolute value of the difference between the return air temperature detected by each temperature sensor and the temperature threshold is less than the first specified value, when it is determined that an absolute value of a difference between fan rotational speeds of any two adjacent air conditioners is greater than a second specified value, adjust a fan rotational speed of an air conditioner whose fan rotational speed is lower in the two adjacent air conditioners.

9. The controller according to claim 8, wherein the transceiver is further configured to obtain an air pressure value detected by a wireless pressure sensor that is disposed at an air vent end of each air conditioner; and
after it is determined that the absolute value of the difference between the return air temperature detected by each temperature sensor and the temperature threshold is less than the first specified value, the processor is further configured to:
adjust, according to a difference between the air pressure value that is detected by each wireless pressure sensor and that is obtained by the transceiver and an air pressure threshold, a fan rotational speed of an air conditioner until it is determined that an absolute value of the difference between the air pressure value that is detected by each wireless pressure sensor and that is obtained by the transceiver and the air pressure threshold is less than a third specified value; and before the adjusting a fan rotational speed of an air conditioner whose fan rotational speed is lower in the two adjacent air conditioners, the processor is further configured to:

determine that the absolute value of the difference between the air pressure value detected by each wireless pressure sensor and the air pressure threshold is less than the third specified value.

\* \* \* \* \*